(12) United States Patent
Brown

(10) Patent No.: US 7,070,373 B2
(45) Date of Patent: Jul. 4, 2006

(54) CARGO NET

(75) Inventor: Julian Brown, Dorset (GB)

(73) Assignee: Amsafe Bridport Limited, Bridport (GB)

( * ) Notice: Subject to any disclaimer, the term of this patent is extended or adjusted under 35 U.S.C. 154(b) by 374 days.

(21) Appl. No.: 10/467,196

(22) PCT Filed: Jan. 22, 2002

(86) PCT No.: PCT/GB02/00276

§ 371 (c)(1),
(2), (4) Date: Dec. 8, 2003

(87) PCT Pub. No.: WO02/062619

PCT Pub. Date: Aug. 15, 2002

(65) Prior Publication Data

US 2005/0258067 A1   Nov. 24, 2005

(30) Foreign Application Priority Data

Feb. 5, 2001   (GB) .................................. 0102823.2

(51) Int. Cl.
*B61D 45/00*   (2006.01)
(52) U.S. Cl. .................................................. 410/97
(58) Field of Classification Search ................ 410/118, 410/117, 96, 97, 98, 100
See application file for complete search history.

(56) References Cited

U.S. PATENT DOCUMENTS

| | | | | |
|---|---|---|---|---|
| 1,365,511 A * | 1/1921 | Lee | ............................... | 294/77 |
| 1,966,893 A * | 7/1934 | Harris | ........................ | 410/156 |
| 2,705,461 A * | 4/1955 | Campbell | ..................... | 410/97 |
| 2,760,402 A * | 8/1956 | Ederer | ............................ | 87/53 |
| 2,854,931 A * | 10/1958 | Campbell | .................... | 410/118 |
| 3,084,966 A * | 4/1963 | Higgins | ........................ | 294/77 |
| 3,173,539 A * | 3/1965 | Looker | ........................ | 206/597 |
| 3,961,585 A * | 6/1976 | Brewer | ......................... | 410/97 |
| 4,158,985 A * | 6/1979 | Looker et al. | ................. | 87/12 |
| 4,159,840 A * | 7/1979 | Fengels | ........................ | 294/77 |
| 4,270,657 A | 6/1981 | Bayon | | |
| 4,892,210 A * | 1/1990 | Kupersmit | .................. | 220/1.5 |
| 4,900,204 A * | 2/1990 | Summers | ...................... | 410/97 |
| 5,388,702 A * | 2/1995 | Jones | ......................... | 206/597 |
| 5,772,371 A * | 6/1998 | Ackerman | .................. | 410/118 |
| 5,869,162 A * | 2/1999 | Traa | ............................. | 428/58 |

FOREIGN PATENT DOCUMENTS

| | | |
|---|---|---|
| CN | 2416044 Y | 1/2001 |
| DE | 29900794 B1 | 6/1999 |
| DE | 29915603 B1 | 2/2000 |
| GB | 1218860 B1 | 1/1971 |
| GB | 2338472 A1 | 12/1999 |

* cited by examiner

*Primary Examiner*—H Gutman
(74) *Attorney, Agent, or Firm*—Marshall, Gerstein & Borun LLP

(57) ABSTRACT

A cargo net (1) comprising a plurality of interconnected netting strands (2) providing a mesh (3) and having a main panel (4) and a plurality of wing panels (5) extending therefrom, the main panel (4) being adapted to overlie the cargo in use and the wing panels (5) being adapted to hang down against sides of the cargo to surround the cargo, each wing panel (5) having an edge (6) which in use meets an edge (6) of an adjacent wing panel (5) to define a net corner (7), the net including a plurality of corner securement devices (8) spaced apart along the net corner (7) whereby the corner is releasably secured for use, each securement device (8) comprising a projection extending from one of the meeting edges and an eye associated with the projection.

27 Claims, 3 Drawing Sheets

CARGO NET

FIELD OF THE INVENTION

The present invention relates to a cargo net, and more particularly to a cargo net for securing cargo on a platform or pallet, e.g. in the hold of an aircraft.

BACKGROUND OF THE INVENTION

It is well known to secure cargo on a platform or pallet by means of a net lying over the cargo and secured to the platform or pallet. Conventionally, such nets comprise a main panel, having a plurality of wing panels extending therefrom. The net typically has a generally rectangular main panel and four generally rectangular wing panels, thus forming a generally cruciform shape.

To secure the cargo on the platform or pallet, the main panel of the net is lain on top of the cargo and the wing panels arranged to hang down against the sides of the cargo to surround the cargo. The meeting edges of adjacent wing panels are releasably secured together to form a corner by means of a so-called "lashing line" or "corner tie". The lashing line or corner tie is a cord which extends from the main panel of the net between the wing panels. To form the corner between adjacent wing panels, the lashing line or corner tie is threaded to and fro between the wing panels at the meeting edges in a downwards direction away from the main panel, to lace the meeting edges together, before being tied off with a knot, or secured by a hook, near the platform or pallet.

The bottom edges of the wing panels are provided with securement devices, e.g. floor fittings, which are adapted to engage with complementary devices of the platform or pallet, whereby the net is secured to the platform or pallet.

To release the net, the above securement procedure is reversed.

Such known nets suffer from a number of disadvantages. The operation of threading and unthreading the lashing line can be slow and troublesome. Moreover, the lashing lines can become knotted and tangled. The securement knot at the end of a lashing line can be difficult to release, and it is quite common for cargo handlers to cut a lashing line for release, if the knot has tightened during transport or if the line has become entangled with the net. It is then necessary for a fresh lashing line to be provided before the net can be reused.

SUMMARY OF THE INVENTION

It is an object of the present invention to go at least some way towards overcoming the above disadvantages, or at least to provide an acceptable alternative system for releasably securing the meeting edges of each adjacent pair of wing panels together to form a net corner.

According to the present invention, there is provided a cargo net comprising a plurality of interconnected netting strands providing a mesh and having a main panel and a plurality of wing panels extending therefrom, the main panel being adapted to overlie the cargo in use and the wing panels being adapted to hang down against sides of the cargo to surround the cargo, each wing panel having an edge which in use meets an edge of an adjacent wing panel to define a net corner, the net including a plurality of corner securement devices spaced apart along the net corner whereby the corner is releasably secured for use, each securement device comprising a projection extending from one of the meeting edges and an eye associated with the projection, wherein the arrangement is such that the eye of a first securement device can engage a portion of the net mesh at the net corner and can then receive a second securement device which passes therethrough and engages a portion of the net mesh at the net corner thereby holding the meeting edges mutually together at the net corner.

It is most preferred that the first securement device is correspondingly arranged to engage a portion of the net mesh at the net corner, thereby holding the meeting edges mutually together, and that the eye of the first and subsequent securement devices are correspondingly arranged to receive second and subsequent securement devices which pass through each respective eye of the first and subsequent securement devices and engage, in each case, a portion of the net mesh at the net corner, thereby holding the meeting edges mutually together along the net corner.

The securement devices preferably comprise flexible projections each extending from one of the meeting edges (e.g. each extending from the same meeting edge of a particular corner). The eye of a projection may comprise a flexible loop. A securement device may conveniently consist of a single loop of a flexible material, e.g. of the netting strand material or another natural and/or synthetic material, secured to a wing panel and extending therefrom.

In a particularly advantageous form, the device may be formed by a net strand itself, i.e. integral with the net. This form provides the substantial advantage that the devices cannot be removed from the net.

In addition, it is preferred that the projections of the securement devices are of a colour which contrasts with the mesh of the net. This enables quick identification of the securement devices by the user.

It is preferred that the securement devices are spaced apart by one normal diagonal dimension of the mesh of the net, along the line of the corner, and that each projection should be at least as long as the normal diagonal dimension of the mesh of the net, preferably about 50% or more longer. According to current international aviation regulations, the mesh dimension of a cargo net cannot be greater than 10 inches (25 cm) along each side (corresponding to a normal diagonal dimension of the square mesh of about 14 inches (36 cm)). The same requirement applies in principle to the net corners. The length of a projection will therefore be selected, according to the mesh size and the spacing of the projections, so that the engaged securement devices provide in use a releasable mesh of interengaged parts across the corner, having a mesh size within the international aviation regulations, and preferably no greater than the mesh size of the net itself.

The net may preferably be constructed from natural, synthetic or mixed natural/synthetic fibrous strands. The mesh shape may be any conventional shape, e.g. "diamond" or "square". The net may be constructed from a number of connected panels or sub-panels. The mesh sizes and shapes may be the same or different as between different panels or sub-panels. The breaking strength of the strands may suitably be in the range of between about 2 and about 50 kN. Suitable materials include strands of twisted, braided, woven or plaited polypropylene, polyester or nylon.

The net may include conventional tensioning devices and/or devices for attachment to the pallet, the platform or the cargo. Such devices may comprise hooks, for example reefing hooks, secured to strands of the netting material. As is well known, such hooks can be used to tension the net and take up slack in the net, by hooking the hooks around strands of other parts of the netting to make a tuck and thereby tension the net over the cargo.

According to a second aspect of the present invention, there is provided a method of securing a cargo net comprising a first step of engaging the first securement device with a corresponding portion of the net mesh on the adjacent wing panel such that the edges are held together and a second step of sequentially engaging each subsequent securement device with the eye of the preceding device and a corresponding portion of net mesh on the adjacent wing panel.

The securement devices may either be sequentially threaded into their respective neighbours and the net mesh, in order starting from the top (adjacent to the main panel) of the net and working downwards or starting from the bottom of the net and working upwards.

Each securement device is preferably adapted so that, after threading it through the eye of the preceding (upwardly or downwardly adjacent) device and the net mesh, and pulling the securement device downwards (or upwards) to close the corner, it thereby provides a free eye to receive the next (downwardly or upwardly adjacent) device, and so on.

The free eye of the bottom-most (or top most) device preferably carries a locking device, e.g. a conventional spring-closed hook or double stud fitting, to secure it to a strand of the net or to the platform or pallet.

The net according to the present invention enables the corners to be speedily and safely constructed when the net is lain over a cargo, with substantially reduced likelihood of broken or missing parts, as compared with conventional nets. Moreover, the net can be quickly released from the cargo by releasing the locking device at the end of the corner and pulling the corner apart. Because each securement device is relatively short, and typically passes through only an eye of an adjacent device and one mesh of the net, frictional resistance to separation of the corner is not great.

BRIEF DESCRIPTION OF THE DRAWINGS

For a better understanding of the invention, reference will now be made to the accompanying drawings showing, solely by way of example, one embodiment of the present invention, in which.

DETAIL DESCRIPTION OF THE INVENTION

Figure 1:
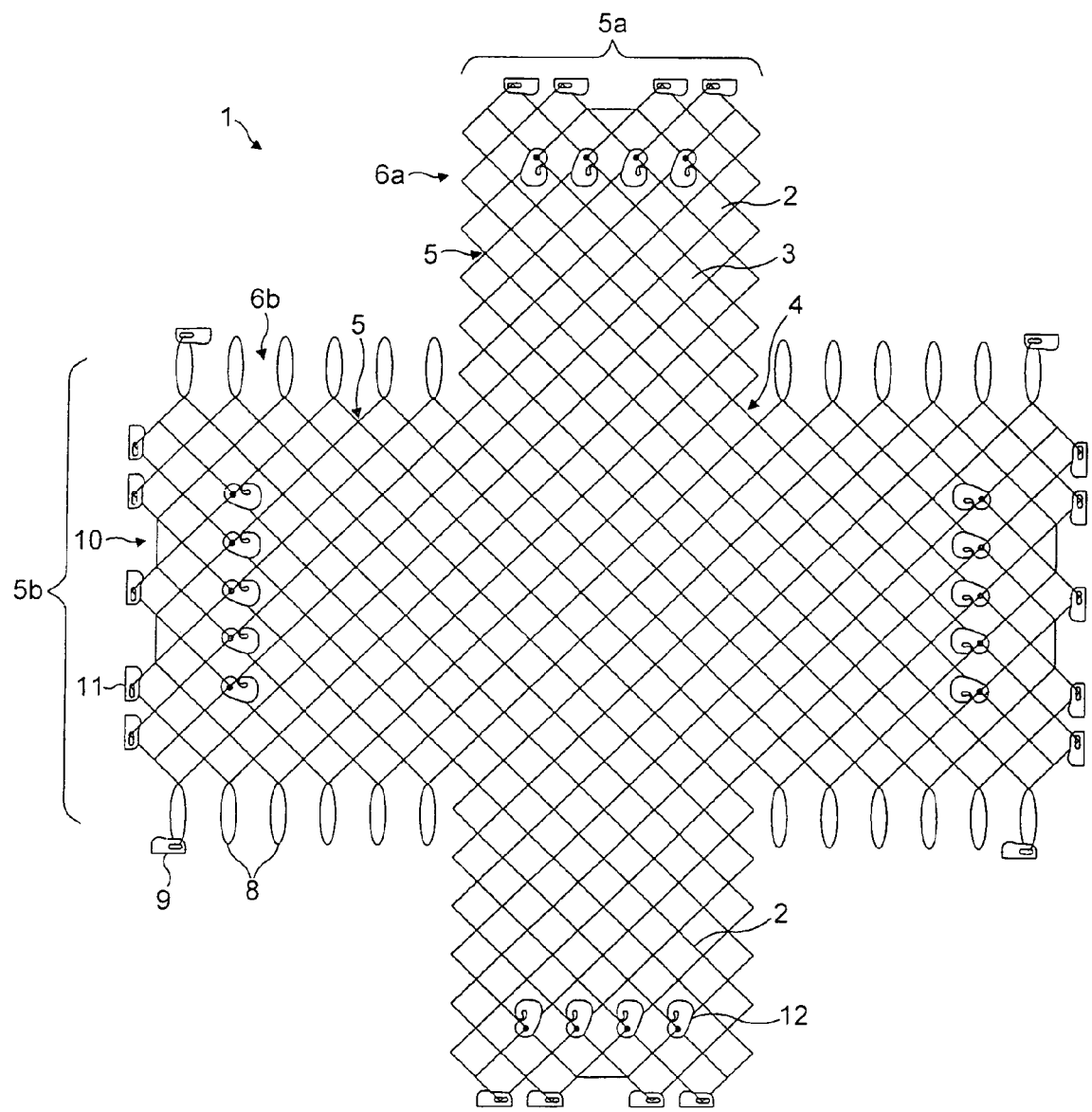
FIG. 1 is a plan view of an embodiment of a cargo net according to the present invention.

Referring now to FIG. 1, this shows a plan view of an embodiment of a cargo net 1 according to the present invention. The net 1 comprises a plurality of interconnected netting strands 2 providing a diamond mesh 3 and having a rectangular main body 4 and four rectangular wing panels 5 extending therefrom. The wing panels 5 can be divided into two pairs with the wing panels 5a which extend from the short sides of the main body (short side wing panels) being the same and the wing panels 5b which extend from the long sides of the main body (long side wing panels) also being the same. The adjacent wing panels 5a, 5b have adjacent edges 6a, 6b.

The net 1 includes a plurality of loops 8 formed integrally of netting strand material as part of the interconnection of the netting strands, which extend from the edges 6b of wing panels 5b and are spaced one diagonal mesh dimension apart along the length of the edge 6b. Each loop 8 is approximately 1.5 times the length of one diagonal mesh dimension, so that the loops 8, after engagement in the manner described below, form an integrated mesh having a mesh size no greater than the mesh size of the net itself. The free end of each of the bottom most loops 8 (the loop furthest from the main body) is provided with a locking device 9 such that it may be secured to a pallet or platform. The net 1 is adapted such that in use the main body 4 will lie over the top of the cargo and the wing panels 5 will hang down the sides of the cargo to surround the cargo. When this is the case the adjacent wing panels 5a, 5b have adjacent edges 6a, 6b which meet to define a net corner line 7 as shown in FIGS. 2 and 3.

The bottom edges 10 of the wing panels 5 are provided with floor securement devices 11 which are adapted to engage with complimentary devices of a platform or pallet, whereby the net 1 is secured to the platform or pallet. Each of the wing panels 5 are provided with additional hooks 12 which may be used as tensioning devices. These hooks 12 can be used to tension the net and take up the slack in the net by hooking around strands or other parts of the netting to make a tuck and thereby tension the net over the cargo.

Figure 2:
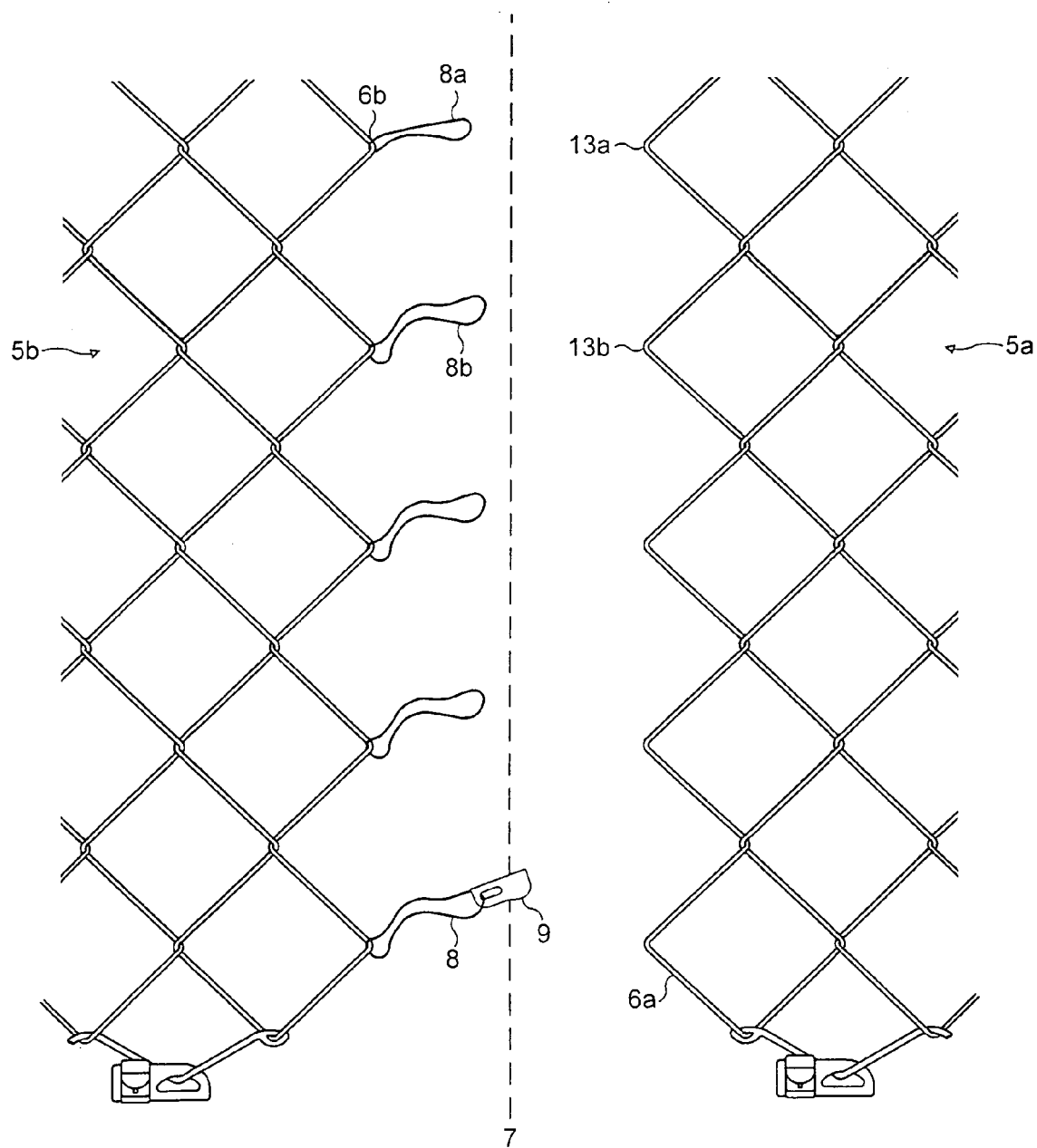
FIG. 2 shows the edges of two adjacent wing panels of the cargo net before closure.
Figure 3:
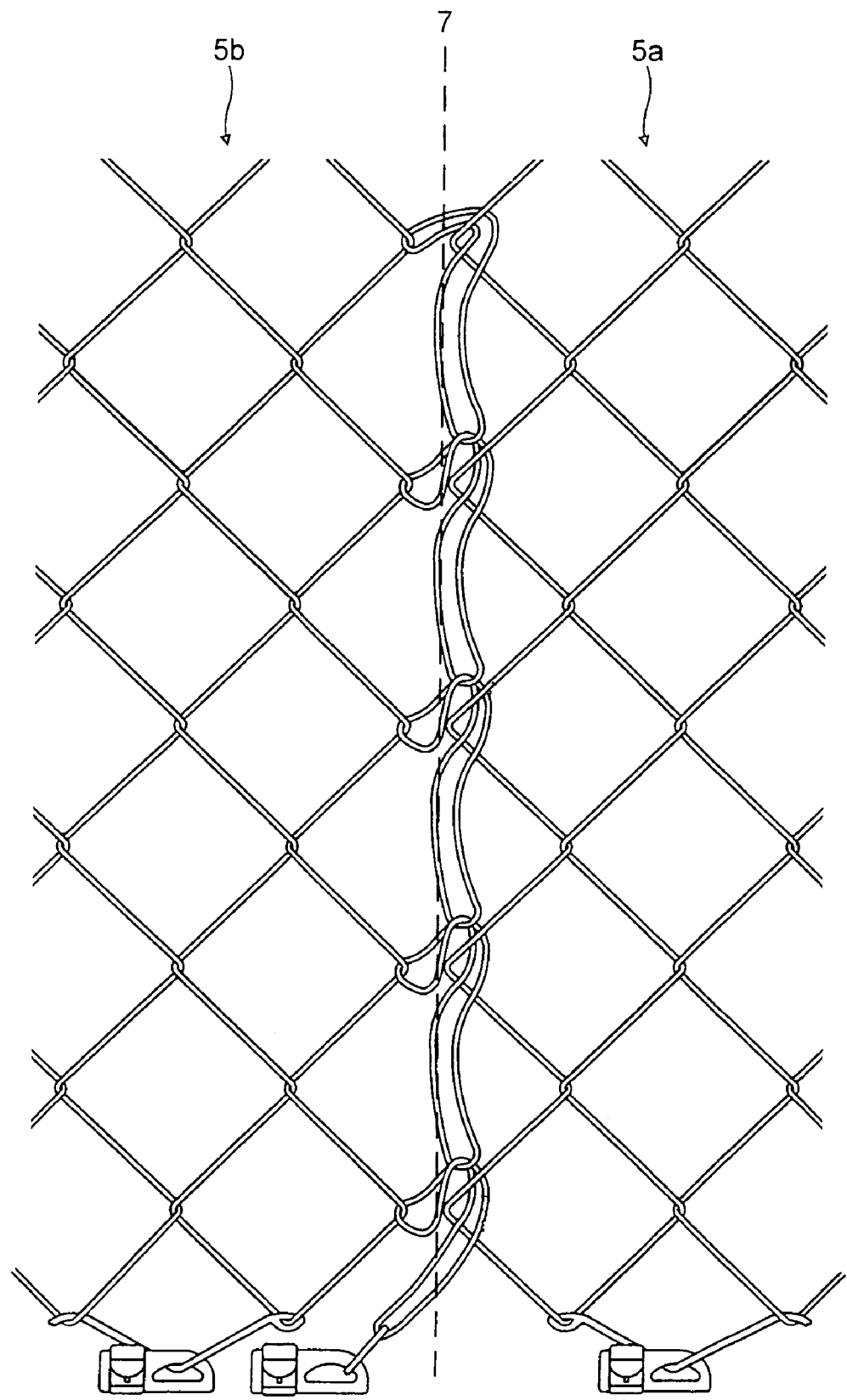
FIG. 3 shows the edges of two adjacent wing panels of the cargo net after closure.

FIG. 2 shows a portion of two adjacent wing panels 5a, 5b which come together and have edges 6a, 6b which meet to define a net corner line 7. Wing panel 5b has a plurality of loops 8 spaced one diagonal mesh dimension apart along the length of the edge 6b. The loops 8 are formed integrally of a single loop of netting strand material. Each loop 8 is approximately 1.5 times the length of one diagonal mesh dimension so that the loops 8, after engagement across the corner line 7 in the manner described below, form an integrated mesh having a mesh size no greater than the mesh size of the net itself.

To assemble the secured corner, one starts from the top and passes the first loop 8a through the corresponding portion of the net mesh 13a at the edge 6a of the adjacent wing panel 5a. The first loop 8a is then pulled downwards, to draw that part of the corner together. Next, a second loop 8b is passed through the eye of the first loop 8a and then through a portion of the net mesh 13b at the edge of the wing panel 5a, and pulled downwards, to draw that part of the corner together. The procedure is repeated down the corner until the last loop is reached. Here, the loop is simply secured to a floor fitting on a platform or pallet, by means of a conventional locking device 9.

While the above description details how the corner may be secured working from the top to the bottom it is equally possible that the procedure may be followed working from the bottom up with the last loop being secured to a convenient netting strand.

To release the net, the locking device 9 is released and the wing panels 5a, 5b pulled manually apart. It is found that the frictional resistance is sufficiently low that this pulling apart is easily accomplished. The corner releases sequentially up the corner line 7, in essentially the reverse of the securing procedure.

FIG. 3 shows a portion of a cargo net according to the preset invention in which the net corner has been secured as described above.

The present invention avoids the need for long lashing lines, which can get caught, knotted, tangled, frayed, cut or removed, and enables the speed and efficiency of securement and removal of cargo nets to be significantly improved, compared with known products.

The present invention has been broadly described, without limitation. Variations and modifications as will be readily apparent to those of ordinary skill in this art are intended to be included within the scope of this application.

The invention claimed is:

1. A cargo net comprising a plurality of interconnected netting strands providing a net mesh, the net mesh having a main panel and a plurality of wing panels extending therefrom, the main panel being adapted to overlie the cargo in use, the wing panels being adapted to hang down against sides of the cargo to surround the cargo, each wing panel having an edge which in use meets an edge of an adjacent wing panel to define a net corner, a plurality of corner securement devices spaced apart along the net corner whereby the corner is releasably secured for use, each securement device comprising a projection extending from one of the meeting edges and an eye associated with the projection, wherein the eye of a first said securement device can engage a portion of the net mesh of the adjacent wing panel at the net corner and can then receive a second said securement device which passes therethrough and engages a portion of the net mesh of the adjacent wing panel at the net corner thereby holding the meeting edges mutually together at the net corner.

2. A cargo net according to claim 1, wherein the first securement device is correspondingly arranged to engage a portion of the net mesh of the adjacent wing panel at the net corner, thereby holding the meeting edges mutually together, and the eye of the first and subsequent securement devices are correspondingly arranged to receive the second and subsequent securement devices which pass through each respective eye of the first and subsequent securement devices and engage, in each case, a portion of the net mesh of the adjacent wing panel at the net corner thereby holding the meeting edges mutually together at the net corner.

3. A cargo net according to claim 1, wherein the securement devices comprise flexible projections each extending from one of the meeting edges.

4. A cargo net according to claim 3, wherein the eye of each flexible projection comprises a flexible loop.

5. A cargo net according to claim 3, wherein the securement devices comprise a single loop of flexible material.

6. A cargo net according to claim 5, wherein the flexible material is the same material as the net mesh.

7. A cargo net according to claim 1, wherein the securement devices are integral with the net mesh.

8. A cargo net according to claim 1, wherein the projections of the securement devices are of a contrasting colour to the net mesh.

9. A cargo net according to claim 1, wherein the securement devices are spaced apart by one normal diagonal dimension of the net mesh, along the line of the corner.

10. A cargo net according to claim 1, wherein each projection is at least the same length as the normal diagonal dimension of the net mesh.

11. A cargo net according to claim 10, wherein each projection is about 50% or more longer than the normal diagonal dimension of the net mesh.

12. A cargo net according to claim 1, wherein the net mesh is constructed from natural fibrous strands.

13. A cargo net according to claim 1, wherein the net mesh is constructed from synthetic fibrous strands.

14. A cargo net according to claim 1, wherein the net mesh is constructed from a mixture of natural fibrous strands and synthetic fibrous strands.

15. A cargo net according to claim 1, wherein the net mesh shape is diamond.

16. A cargo net according to claim 1, wherein the net mesh shape is square.

17. A cargo net according to claim 1, wherein the breaking strength of the netting strands is in the range of between about 2 and about 50kN.

18. A cargo net according to claim 1, wherein the net mesh is provided with tensioning devices to take up the slack in the net mesh.

19. A cargo net according to claim 18, wherein the tensioning devices comprise hooks.

20. A cargo net according to claim 18, wherein the tensioning devices comprise reefing hooks.

21. A cargo net according to claim 1, wherein the net mesh is provided with securing means for attaching it to one of a platform and a pallet.

22. A cargo net according to claim 21, wherein the securing means comprise floor securement devices.

23. A method of securing a cargo net, comprising steps of:

forming a cargo net to have a plurality of interconnected netting strands providing a net mesh, with the net mesh having a main panel and a plurality of wing panels extending therefrom, the main panel adapted to overlie the cargo in use, the wing panels adapted to hang down against the sides of the cargo to surround the cargo, each wing panel having an edge which in use meets an edge of an adjacent wing panel to define a net corner;

providing a plurality of corner securement devices spaced apart along the net corner whereby the corner can be releasably secured for use, with each securement device comprising a projection extending from one of the meeting edges and an eye associated with the projection;

engaging a first said securement device with a corresponding portion of the net mesh on the adjacent wing panel such that the edges are held together; and sequentially engaging each subsequent securement device with the eye of the proceeding device and a corresponding portion of the net mesh on the adjacent wing panel.

24. A method of securing a cargo net according to claim 23, wherein the securement devices are sequentially engaged starting from the top of the net mesh and working downwards.

25. A method of securing a cargo net according to claim 23, wherein each securement device is adapted so that, after threading it through the eye of the preceding securement device and the net mesh, and pulling the securement device tight to close the corner, there is provided a free eye to receive the next securement device.

26. A method of securing a cargo net according to claim 23, wherein the free eye of the final securement device comprises a locking means to secure the free eye.

27. A method of securing a cargo net according to claim 26, wherein the locking means comprises a double stud fitting.

* * * * *